US010992834B2

(12) United States Patent
Sasaki

(10) Patent No.: US 10,992,834 B2
(45) Date of Patent: Apr. 27, 2021

(54) IMAGE PROCESSING APPARATUS, METHOD FOR CONTROLLING THE SAME, AND COMPUTER-READABLE STORAGE MEDIUM

(71) Applicant: CANON KABUSHIKI KAISHA, Tokyo (JP)

(72) Inventor: Yuto Sasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 16/398,425

(22) Filed: Apr. 30, 2019

(65) Prior Publication Data

US 2019/0356804 A1 Nov. 21, 2019

(30) Foreign Application Priority Data

May 17, 2018 (JP) .............................. JP2018-095632
Aug. 9, 2018 (JP) .............................. JP2018-150641

(51) Int. Cl.
*H04N 1/00* (2006.01)

(52) U.S. Cl.
CPC ....... *H04N 1/00938* (2013.01); *H04N 1/0096* (2013.01); *H04N 1/0097* (2013.01); *H04N 1/00925* (2013.01); *H04N 2201/0094* (2013.01)

(58) Field of Classification Search
USPC ......... 358/1.1–3.29, 1.11–1.18, 404, 426.05, 358/426.06; 399/8–24, 42–46, 75–83
See application file for complete search history.

(56) References Cited

U.S. PATENT DOCUMENTS

| 9,542,228 B2 | 1/2017 | Fujisawa et al. |
| 2004/0190084 A1 | 9/2004 | Shirai |
| 2009/0316167 A1 | 12/2009 | Sato |
| 2011/0258301 A1* | 10/2011 | McCormick ............ H04L 67/34 709/222 |

(Continued)

FOREIGN PATENT DOCUMENTS

| CN | 101017477 A | 8/2007 |
| CN | 101610337 A | 12/2009 |
| CN | 104243764 A | 12/2014 |

(Continued)

OTHER PUBLICATIONS

Office Action issued in Chinese Appln. No. 201910405589.6 dated Jan. 26, 2021.

*Primary Examiner* — Marcellus J Augustin
(74) *Attorney, Agent, or Firm* — Rossi, Kimms & McDowell LLP

(57) ABSTRACT

An image processing apparatus compares a total memory usage obtained from the obtained memory usages of the respective image processes and the memory usage when the requested new image process is executed, with an allowable memory capacity representing a memory usage allowed to be used in a process of executing the plugin application; and, in a case where the total memory usage does not exceed the allowable memory capacity as a result of the comparison, executes the new image process, and in a case where the total memory usage exceeds the allowable memory capacity, notifies a request source of an error representing that the new image process cannot be executed owing to an insufficient memory, without executing the new image process.

16 Claims, 11 Drawing Sheets

(56) References Cited

U.S. PATENT DOCUMENTS

2016/0255230 A1\* 9/2016 Tabushi ............ H04N 1/32448
　　　　　　　　　　　　　　　　　　　　　358/1.14

FOREIGN PATENT DOCUMENTS

| CN | 104461655 A | 3/2015 |
| CN | 106648747 A | 5/2017 |
| CN | 107659746 A | 2/2018 |
| CN | 107977242 A | 5/2018 |
| JP | 2014239302 A | 12/2014 |

\* cited by examiner

IMAGE PROCESSING APPARATUS, METHOD FOR CONTROLLING THE SAME, AND COMPUTER-READABLE STORAGE MEDIUM

BACKGROUND OF THE INVENTION

Field of the Invention

The present invention relates to an image processing apparatus, a method for controlling the same, and a computer-readable storage medium.

Description of the Related Art

It has conventionally been known that when executing various jobs including image processing not provided by an image processing apparatus, a job execution application including new image processing is created as a plugin and installed in the image processing apparatus to implement the new image processing. Various jobs are, for example, device control processes including image processes executable on the image processing apparatus, such as copy, print, scan and save, and scan and send. The new image processing is processing that cannot be implemented by an existing job in the image processing apparatus, such as skew correction, format conversion, or translation after OCR (Optical Character Recognition) with respect to input data.

The image processing apparatus to which a plurality of new image processes are added can execute in parallel the added new image processes. However, when a plurality of image processes that use a lot of memory are executed simultaneously, the memory usage may exceed the upper limit of the memory of the image processing apparatus.

When the memory usage exceeds the upper limit of the memory, the OS performs a swap operation to temporarily save data of a memory area of a low use frequency in the hard disk, free the area, and if necessary, write back the data in the memory. At this time, write processing is performed on the HDD and may decrease the performance of various processes within this process. For example, when a UI module exists in this process, a phenomenon in which the UI screen does not quickly respond to a user operation may occur. A phenomenon may also occur in which the time till the completion of a plurality of image processes executed in the same process becomes longer than the time taken when no swap operation is performed. If even the swap area runs out, the OS forcibly terminates a process that uses a lot of memory source. In this case, the process to perform image processing ends, so the image processing cannot be restarted unless the image processing apparatus is rebooted.

To solve this, Japanese Patent Application No. 2013-120103 proposes a technique of measuring the memory usage of each plugin in real time and when it exceeds a predetermined maximum memory capacity, not activating the plugin.

However, the above-described related art has a problem to be described below. In this related art, for example, the sum of a declared memory usage defined for each plugin and the usage of a memory already used in the image processing apparatus is calculated at the time of activating a plugin. If the total memory usage exceeds a predetermined maximum memory capacity, an insufficient memory as described above is avoided by not activating the plugin itself. In the above-described control, when the calculated memory usage exceeds the maximum memory capacity, no new plugin can be activated unless an already activated plugin is stopped. Even a plugin that can be actually executed unless it is executed in parallel cannot be activated to perform processing. This impairs the user convenience.

SUMMARY OF THE INVENTION

The present invention enables realization of a mechanism of dynamically calculating a total memory usage during execution of processing (in the run time) and executing in parallel a plurality of image processes while preferably avoiding an insufficient memory without restricting the activation of a plugin itself.

One aspect of the present invention provides an image processing apparatus capable of executing a plurality of image processes by one or more plugin application, the apparatus comprising: memory device that stores a set of instructions; and at least one processor that executes the set of instructions to: in a case where execution of a new image process by a plugin application is requested during execution of image processes by a plugin application, search for a plugin application capable of executing the new image process; obtain a memory usage when the new image process by the plugin application is executed, which is held together with the searched plugin application, and memory usages of the respective image processes already running by the plugin application; compare a total memory usage obtained from the obtained memory usages of the respective image processes and the memory usage when the requested new image process is executed, with an allowable memory capacity representing a memory usage allowed to be used in a process of executing the plugin application; and in a case where the total memory usage does not exceed the allowable memory capacity as a result of the comparison, execute the new image process, and in a case where the total memory usage exceeds the allowable memory capacity, notify a request source of an error representing that the new image process cannot be executed owing to an insufficient memory, without executing the new image process.

Another aspect of the present invention provides an image processing apparatus capable of executing a plurality of image processes in a first execution environment for executing a program described in a first programming language and a second execution environment for executing a program described in a second programming language, the apparatus comprising: a memory device that stores a set of instructions; and at least one processor that executes the set of instructions to: in a case where execution of a new image process by a first application described in the first programming language is requested during execution of image processes in the first execution environment, search for a first application capable of executing the new image process; obtain a memory usage when the new image process by the first application is executed, which is held together with the searched first application, and memory usages of the respective image processes already running in the first execution environment; compare a total memory usage obtained from the obtained memory usages of the respective image processes and the memory usage when the requested new image process is executed, with an allowable memory capacity representing a memory usage allowed to be used in the first execution environment; and in a case where the total memory usage does not exceed the allowable memory capacity as a result of the comparison, execute the new image process, and in a case where the total memory usage exceeds the allowable memory capacity, notify a request source of an error representing that the new image process cannot be executed owing to an insufficient memory, without executing the new image process.

Still another aspect of the present invention provides a method for controlling an image processing apparatus capable of executing a plurality of image processes by one or more plugin application, the method comprising: in a case where execution of a new image process by a plugin application is requested during execution of image processes by a plugin application, searching for a plugin application capable of executing the new image process; obtaining a memory usage when the new image process by the plugin application is executed, which is held together with the searched plugin application, and memory usages of the respective image processes already running by the plugin application; comparing a total memory usage obtained from the obtained memory usages of the respective image processes and the memory usage when the requested new image process is executed, with an allowable memory capacity representing a memory usage allowed to be used in a process of executing the plugin application; and in a case where the total memory usage does not exceed the allowable memory capacity as a result of the comparison, executing the new image process, and in a case where the total memory usage exceeds the allowable memory capacity, notifying a request source of an error representing that the new image process cannot be executed owing to an insufficient memory, without executing the new image process.

Yet still another aspect of the present invention provides a method for controlling an image processing apparatus capable of executing a plurality of image processes in a first execution environment for executing a program described in a first programming language and a second execution environment for executing a program described in a second programming language, the method comprising: in a case where execution of a new image process by a first application described in the first programming language is requested during execution of image processes in the first execution environment, searching for a first application capable of executing the new image process; obtaining a memory usage when the new image process by the first application is executed, which is held together with the searched first application, and memory usages of the respective image processes already running in the first execution environment; comparing a total memory usage obtained from the obtained memory usages of the respective image processes and the memory usage when the requested new image process is executed, with an allowable memory capacity representing a memory usage allowed to be used in the first execution environment; and in a case where the total memory usage does not exceed the allowable memory capacity as a result of the comparison, executing the new image process, and in a case where the total memory usage exceeds the allowable memory capacity, notifying a request source of an error representing that the new image process cannot be executed owing to an insufficient memory, without executing the new image process.

Still yet another aspect of the present invention provides a non-transitory computer-readable storage medium storing a computer program for causing a computer to execute each step in a method for controlling an image processing apparatus capable of executing a plurality of image processes by one or more plugin application, the control method comprising: in a case where execution of a new image process by a plugin application is requested during execution of image processes by a plugin application, searching for a plugin application capable of executing the new image process; obtaining a memory usage when the new image process by the plugin application is executed, which is held together with the searched plugin application, and memory usages of the respective image processes already running by the plugin application; comparing a total memory usage obtained from the obtained memory usages of the respective image processes and the memory usage when the requested new image process is executed, with an allowable memory capacity representing a memory usage allowed to be used in a process of executing the plugin application; and in a case where the total memory usage does not exceed the allowable memory capacity as a result of the comparison, executing the new image process, and in a case where the total memory usage exceeds the allowable memory capacity, notifying a request source of an error representing that the new image process cannot be executed owing to an insufficient memory, without executing the new image process.

Yet still another aspect of the present invention provides a non-transitory computer-readable storage medium storing a computer program for causing a computer to execute each step in a method for controlling an image processing apparatus capable of executing a plurality of image processes in a first execution environment for executing a program described in a first programming language and a second execution environment for executing a program described in a second programming language, the control method comprising: in a case where execution of a new image process by a plugin application is requested during execution of image processes by a plugin application, searching for a plugin application capable of executing the new image process; causing an obtaining unit to obtain a memory usage when the new image process by the plugin application is executed, which is held together with the searched plugin application, and memory usages of the respective image processes already running by the plugin application; comparing a total memory usage obtained from the obtained memory usages of the respective image processes and the memory usage when the requested new image process is executed, with an allowable memory capacity representing a memory usage allowed to be used in a process of executing the plugin application; and in a case where the total memory usage does not exceed the allowable memory capacity as a result of the comparison, executing the new image process, and in a case where the total memory usage exceeds the allowable memory capacity, notifying a request source of an error representing that the new image process cannot be executed owing to an insufficient memory, without executing the new image process.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

System Arrangement

The first embodiment of the present invention will be described below with reference to the accompanying drawings. First, an example of the arrangement of an image forming system will be described with reference to FIG. 1. The image forming system according to this embodiment includes image processing apparatuses 101 and 102, information processing terminals 103 and 104, and a server 105. The image processing apparatuses 101 and 102, the information processing terminals 103 and 104, and the server 105 are connected to each other via a network 106 so that they can communicate with each other.

Figure 1:
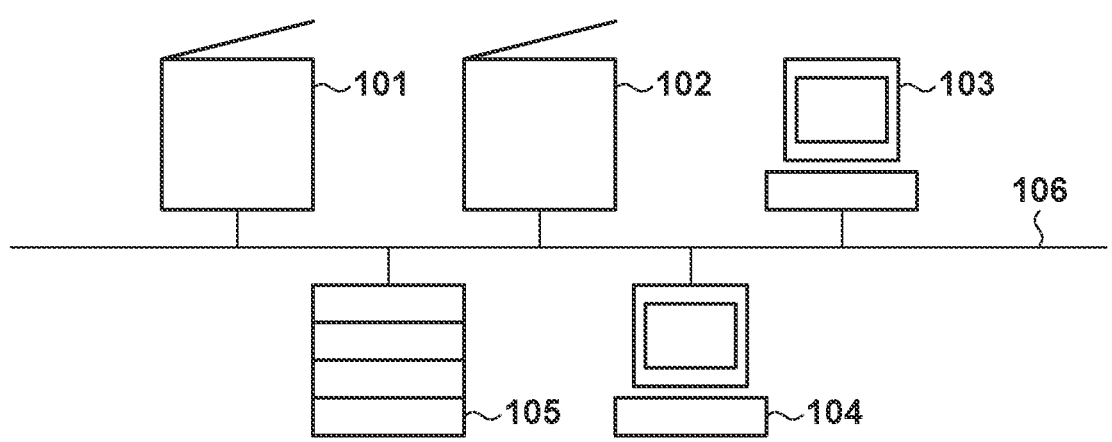
FIG. 1 is a view showing an example of the arrangement of an image processing forming system according to an embodiment.

FIG. 1 illustrates an example in which the two image processing apparatuses 101 and 102 are arranged, but the number of image processing apparatuses is arbitrary (one or more). The respective image processing apparatuses 101 and 102 can be implemented by the same arrangement. Thus, the arrangement of the image processing apparatus 101 will be described as a representative of the image processing apparatuses 101 and 102, and a detailed description of the image processing apparatus 102 will be omitted. Note that the network 106 is a network such as a LAN (Local Area Network) or the Internet through which apparatuses in the image forming system can communicate with each other. It is not intended to limit the numbers and functions of information processing terminals and servers. The server 105 may be implemented by a plurality of apparatuses by distributing its function. Note that the image processing apparatus to which the present invention is applied need not always include the image forming function, and an apparatus capable of simultaneously (in parallel) executing a plurality of image processes is applicable.

The image processing apparatus 101 can receive a print request (print data) of image data from the information processing terminals 103 and 104 and print, read image data by the scanner of the image processing apparatus 101, or print image data read by the scanner. The image processing apparatus 101 can also save print data received from the information processing terminals 103 and 104, or transmit an image read by the scanner of the image processing apparatus 101 to the information processing terminals 103 and 104. The image processing apparatus 101 can perform image processing using the server 105, or print a document stored in the server 105. In addition, the image processing apparatus 101 can implement functions of a well-known image processing apparatus such as MFP (MultiFunction Peripheral).

Hardware Arrangement of Image Processing Apparatus

Figure 2:
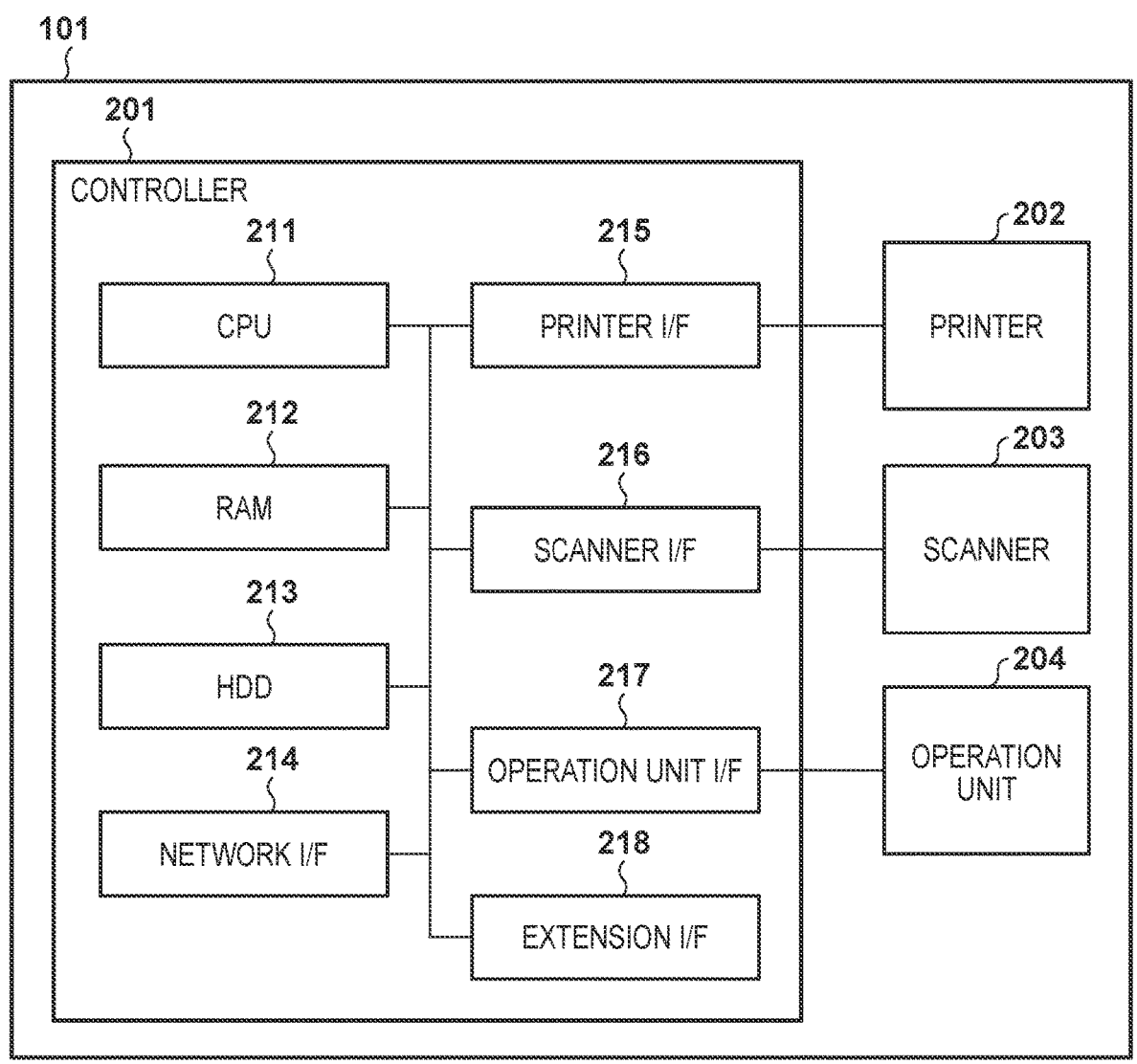
FIG. 2 is a block diagram showing an example of the hardware arrangement of an image processing apparatus according to the embodiment.

Next, an example of the hardware arrangement of the image processing apparatus 101 will be described with reference to FIG. 2. The image processing apparatus 101 includes a controller 201, a printer 202, a scanner 203, and an operation unit 204. The controller 201 includes a CPU 211, a RAM 212, an HDD 213, a network I/F 214, a printer I/F 215, a scanner I/F 216, an operation unit I/F 217, and an extension I/F 218. The CPU 211 can exchange data with the RAM 212, the HDD 213, the network I/F 214, the printer I/F 215, the scanner I/F 216, the operation unit I/F 217, and the extension I/F 218.

The CPU 211 deploys an instruction read out from the HDD 213 in the RAM 212, executes the instruction deployed in the RAM 212, and executes various processes to be described later. The HDD 213 can store instructions executable by the CPU 211, setting values used in the image processing apparatus 101, data associated with processing requested from a user, and the like. The RAM 212 is an area for temporarily storing an instruction read out from the HDD 213 by the CPU 211. The RAM 212 can also store various kinds of data necessary to execute an instruction. For example, image processing can be performed by deploying input data in the RAM 212.

The network I/F 214 is an interface for performing network communication with apparatuses in the image forming system. The network I/F 214 can notify the CPU 211 of reception of data or transmit data in the RAM 212 to the network 106. The printer I/F 215 can transmit print data received from the CPU 211 to the printer 202 or transfer, to the CPU 211, the state of the printer 202 received from the printer 202. The scanner I/F 216 can transmit, to the scanner 203, an image reading instruction received from the CPU 211 and transfer, to the CPU 211, image data received from the scanner 203. Also, the scanner I/F 216 can transfer, to the CPU 211, a state received from the scanner 203.

The operation unit I/F 217 can transfer, to the CPU 211, an instruction input on the operation unit 204 by the user or transfer, to the operation unit 204, screen information for operation by the user. The extension I/F 218 is an interface capable of connecting an external device to the image processing apparatus 101. The extension I/F 218 includes, for example, a USB (Universal Serial Bus) interface. When an external storage device such as a USB memory is connected to the extension I/F 218, the image processing apparatus 101 can read out data stored in the external storage device and write data in the external storage device.

The printer 202 can print, on a printing medium such as paper or a sheet, image data received from the printer I/F 215 or transfer the state of the printer 202 to the printer I/F 215. The scanner 203 can read information written on paper set on the scanner 203 in accordance with an image reading instruction received from the scanner I/F 216, digitize the information, and transfer it to the scanner I/F 216. The scanner 203 can transfer its state to the scanner I/F 216. The operation unit 204 is an interface for prompting the user to perform an operation for inputting various instructions to the image processing apparatus 101. For example, the operation unit 204 includes a liquid crystal screen with a touch panel, provides an operation screen to the user, and accepts an operation from the user.

Software Arrangement of Image Processing Apparatus

Figure 3:
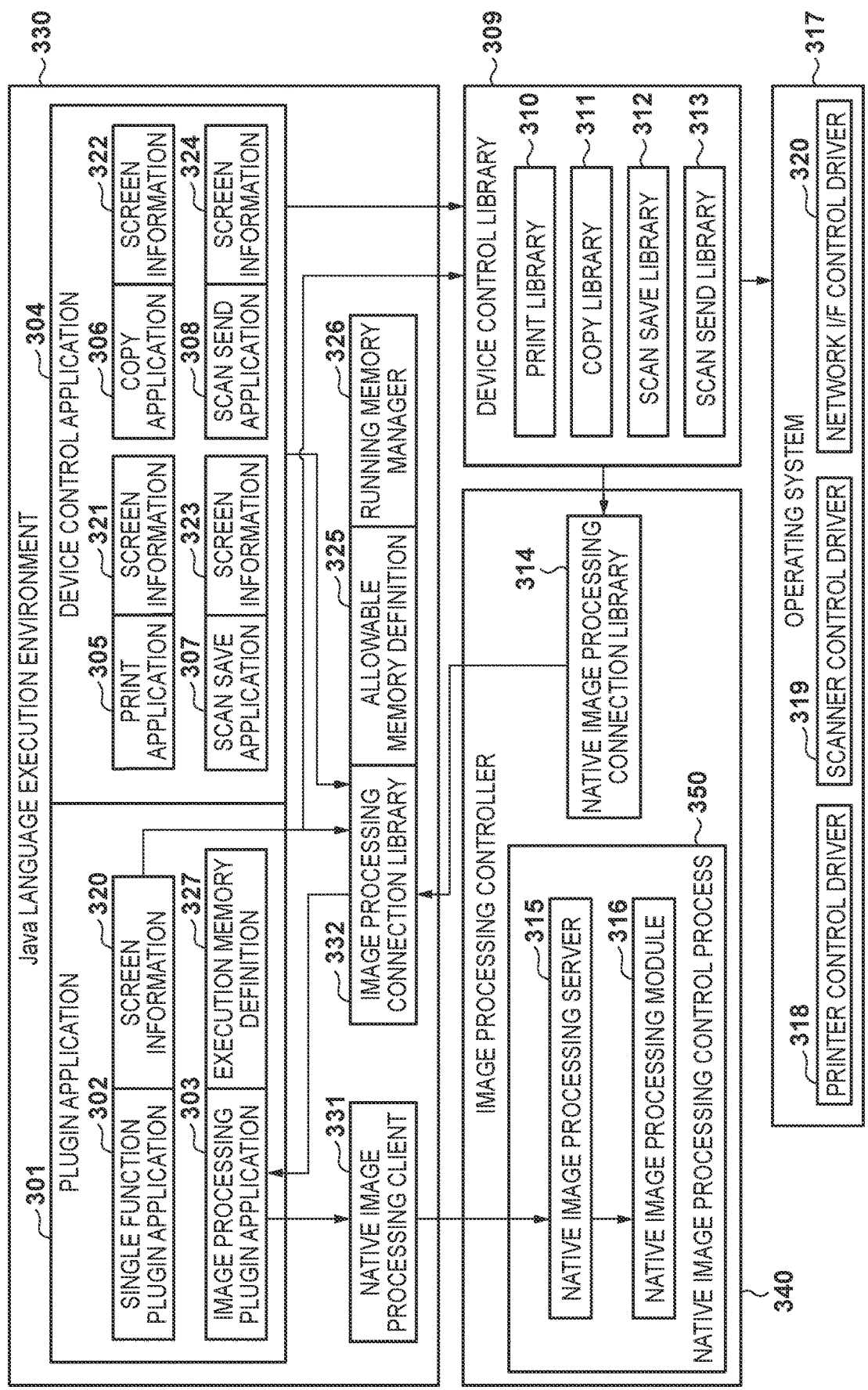
FIG. 3 is a block diagram showing an example of the software arrangement of the image processing apparatus according to the embodiment.

Next, an example of the structure of software processed by the CPU 211 according to this embodiment will be described with reference to FIG. 3. The software having the structure shown in FIG. 3 is configured using a program stored in the HDD 213 of the image processing apparatus 101. In FIG. 3, an upper layer uses services provided by a lower layer, excluding a few exceptions.

In FIG. 3, the lowermost layer is a layer which includes an operating system 317 and in which program execution management, memory management, and the like are performed. A printer control driver 318, a scanner control driver 319, and a network I/F control driver 320 are embedded in the operating system 317. The printer control driver 318, the scanner control driver 319, and the network I/F control driver 320 can function in cooperation with each other. The printer control driver 318 is software for controlling the printer 202 via the printer I/F 215. The scanner control driver 319 is software for controlling the scanner 203 via the scanner I/F 216. The network I/F control driver 320 is software for controlling the network I/F 214.

The second layer from the lowermost layer includes a language device control library 309 serving as an example of the second execution environment, and an image processing controller 340. In this embodiment, for example, the device control library 309 and the image processing controller 340 are described in a compiler language (second programming language) such as the C language or the C++ language. Thus, the device control library 309 and the image processing controller 340 are stored in the HDD 213 in the form of object files directly executable by the CPU 211. The device control library 309 is linked statically or dynamically to a single function plugin application 302 or a device control application 304, which will be described later. The device control library 309 uses the operating system 317 based on an instruction from each application program. In addition, the device control library 309 can request image processing of a native image processing connection library 314.

Next, an example of the arrangement of the device control library 309 will be described. A print library 310 is a library that provides an API (Application Programming Interface) for controlling a print job using the function of the printer control driver 318. The print job represents a series of processes of printing print data saved in the HDD 213 of the image processing apparatus 101 or printing print data received from an external device via the network I/F 214. The external device is, for example, the information processing terminal 103 or 104. A copy library 311 is a library that provides an API for controlling a copy job using the functions of the scanner control driver 319 and the printer control driver 318. The copy job represents a series of processes of printing, by the printer 202, image data scanned by the scanner 203.

A scan save library 312 is a library that provides an API for controlling a scan save job using the function of the scanner control driver 319. The scan save job represents a series of processes of converting image data scanned by the scanner 203 into print data or data of a general-purpose format and saving the data in the HDD 213 or an external storage device such as a USB memory connected to the extension I/F 218. Note that the general-purpose format is a data format such as PDF (Portable Document Format) or JPEG (Joint Photographic Experts Group).

A scan send library 313 is a library that provides an API for controlling a scan send job using the functions of the scanner control driver 319 and the network I/F control driver 320. The scan send job represents a series of processes of converting image data scanned by the scanner 203 into data of a general-purpose format, and transmitting the data to a file server via the network I/F 214, or attaching it to email and transmitting it to an external device. The file server is, for example, the server 105 and the external device is, for example, the information processing terminal 103 or 104.

The image processing controller 340 includes the native image processing connection library 314, a native image processing server 315, and a native image processing module (native application) 316. A native application is an application that is preinstalled in the image processing apparatus 101 and provides various functions such as image processing. To the contrary, a plugin application to be described later is an application that can be added to the image processing apparatus 101 after product shipment. When the native image processing connection library 314 receives an image processing execution request from the device control library 309, it transfers the request contents to an image processing connection library 332. The native image processing server 315 provides a function of executing the native image processing module upon receiving a request from software described in the Java® language to be described later. The native image processing module 316 is software capable of executing various kinds of image processes. Note that the native image processing server 315 and the native image processing module 316 are executed on a native image processing control process 350 that is a program execution unit having a logical memory space separated from other software programs shown in FIG. 3. As a concrete method of separating a memory space, it is conceivable to use a process mechanism provided by a general OS (Operating System), but another method is also available. The configuration of separating a logical memory space when performing image processing can suppress the influence of a processing error on the request side of the processing even when complicated calculation and an accompanying memory operation are performed.

A Java language execution environment 330 serving as the uppermost layer is an example of the first execution environment and is an application layer including a plugin application 301 and the device control application 304. In this embodiment, the plugin application 301 and the device control application 304 are described in the Java language (first programming language) and stored in the HDD 213 in the Java byte code format that is interpreted by a Java virtual machine. The CPU 211 executes the program of the Java virtual machine, and the Java virtual machine reads out and executes Java byte codes to perform processing. One of the reasons for using such a programming language is facilitation of the program description. In Java, the memory area need not be managed by a developer but is managed automatically. The labor of describing a program is reduced and a high developing efficiency is expected.

Each application runs using the APIs of the device control library 309 and the image processing connection library 332 and provides various functions. The function of the device control application 304 can be extended by updating the firmware. A print application 305, a copy application 306, a scan save application 307, and a scan send application 308 that are included in the device control application 304 have screen information 321, screen information 322, screen information 323, and screen information 324, respectively. The CPU 211 can display the screen information 321, the screen information 322, the screen information 323, and the screen information 324 on the operation unit 204 via the operation unit I/F 217. When the user operates the operation unit 204 and the CPU 211 detects change of the settings of the device control application 304, the CPU 211 writes the change contents in the HDD 213.

When the CPU 211 (device control application 304) detects a job execution request via the operation unit 204, it calls the API of the device control library 309 and starts the job. The device control application 304 can request image processing of the image processing connection library 332.

The image processing connection library 332 holds an allowable memory definition 325. The allowable memory definition 325 defines a maximum allowable memory capacity at the time of simultaneous execution by the image processing connection library 332. For example, an allowable memory defined in the allowable memory definition 325 may be directly described in a program and obtained from the HDD 213. Alternatively, a file that defines an allowance may be installed in advance and loaded at the time of execution. Note that the method of obtaining an allowable memory can be a method other than the above-described ones. The image processing connection library 332 further holds a running memory manager 326. The running memory manager 326 manages the total memory capacity of running image processing via the image processing connection library 332.

Next, an example of the device control application 304 will be described. The print application 305 calls the API of the print library 310 and executes a print job. The copy application 306 calls the API of the copy library 311 and executes a copy job. The scan save application 307 calls the API of the scan save library 312 and executes a scan save job. The scan send application 308 calls the API of the scan send library 313 and executes a scan send job.

Next, an example of the plugin application 301 will be described. Unlike the device control application 304 that is a resident application, the plugin application 301 is an application that can be installed as a plugin and uninstalled. The plugin application 301 has the single function plugin application 302 and an image processing plugin application 303. In the plugin application 301, programs necessary for respective operations are packaged. The plugin application 301 is installed in the image processing apparatus 101 by using a remote UI (User Interface) or the like. Note that the remote UI is a mechanism capable of accessing the image processing apparatus 101 from the Web browser of an external device via the network I/F 214, and performing confirmation of the situation of the image processing apparatus 101, the operation of a print job, various settings, and the like. The external device is, for example, the information processing terminal 103 or 104. The plugin application 301 (single function plugin application 302 and image processing plugin application 303) can be activated and stopped individually.

An example of a series of operations from installation of the plugin application 301 to activation, stop, and uninstallation will be described below. When the CPU 211 detects installation of the plugin application 301, it saves information of the plugin application 301 in the HDD 213. When the CPU 211 detects an instruction to start the plugin application 301, it gives an instruction to activate the plugin application 301. While the plugin application 301 is active, it can execute the contents of each program. When the CPU 211 detects an instruction to stop the plugin application 301, it gives an instruction to stop the plugin application 301. When the CPU 211 detects an instruction to uninstall the plugin application 301, it deletes the information of the plugin application 301 from the HDD 213. Note that these instructions can be input from the remote UI or the operation unit 204, but these instructions can be input by a method other than the above-mentioned ones.

Next, an example of the single function plugin application 302 will be described. The single function plugin application 302 has the screen information 321. The single function plugin application 302 can provide the user with a function and screen different from those of the resident device control application 304 by calling the API of the device control library 309. For example, the single function plugin application 302 can provide a plurality of functions in combination, such as functions of copying and scanning given image data, and transmitting a document to a specific destination in a transmission destination database held by the single function plugin application 302. Note that the single function plugin application 302 need not have a function of performing image processing. In this case, no setting is made for image processing. When the device control library 309 receives print data or image data converted into a general-purpose format, it instructs the appropriate operating system 317 of processing control and causes it to execute a job.

Next, an example of the image processing plugin application 303 will be described. The image processing plugin application 303 is an application that provides specific image processing. The image processing plugin application 303 accepts processing target image data and processing parameters from the single function plugin application 302, the device control application 304, or the like via the image processing connection library 332, and executes the requested image processing. The image processing plugin application 303 can receive an image processing request from even the device control library 309 via the native image processing connection library 314 and the image processing connection library 332. Note that a plurality of image processing plugin applications 303 may exist in the HDD 213. For example, respective image processing plugin applications 303 capable of performing image format conversion, skew correction, form recognition, OCR processing, and the like with respect to an input image may exist.

The image processing plugin application 303 may not have the image processing function by itself. For example, the image processing plugin application 303 can use a native image processing client 331 and use the image processing function of the native image processing module 316. One of the reasons for using the native image processing module 316 by the image processing plugin application 303 is a high processing speed when performing image processing. When performing image processing, a large amount of complicated numerical calculation is sometimes performed and a large memory capacity is required during processing. In such a case, the processing speed can be increased by using a compiler language capable of generating an object file directly executable by the CPU, instead of using a programming language processing system for performing processing via a virtual machine like Java.

The image processing plugin application 303 holds an execution memory definition 327. The execution memory definition 327 defines a maximum memory capacity that is used by image processing executed by each plugin. Note that the above-described memory capacity may be held for each plugin or for each function of image processing.

Processing Procedure

Figure 4:
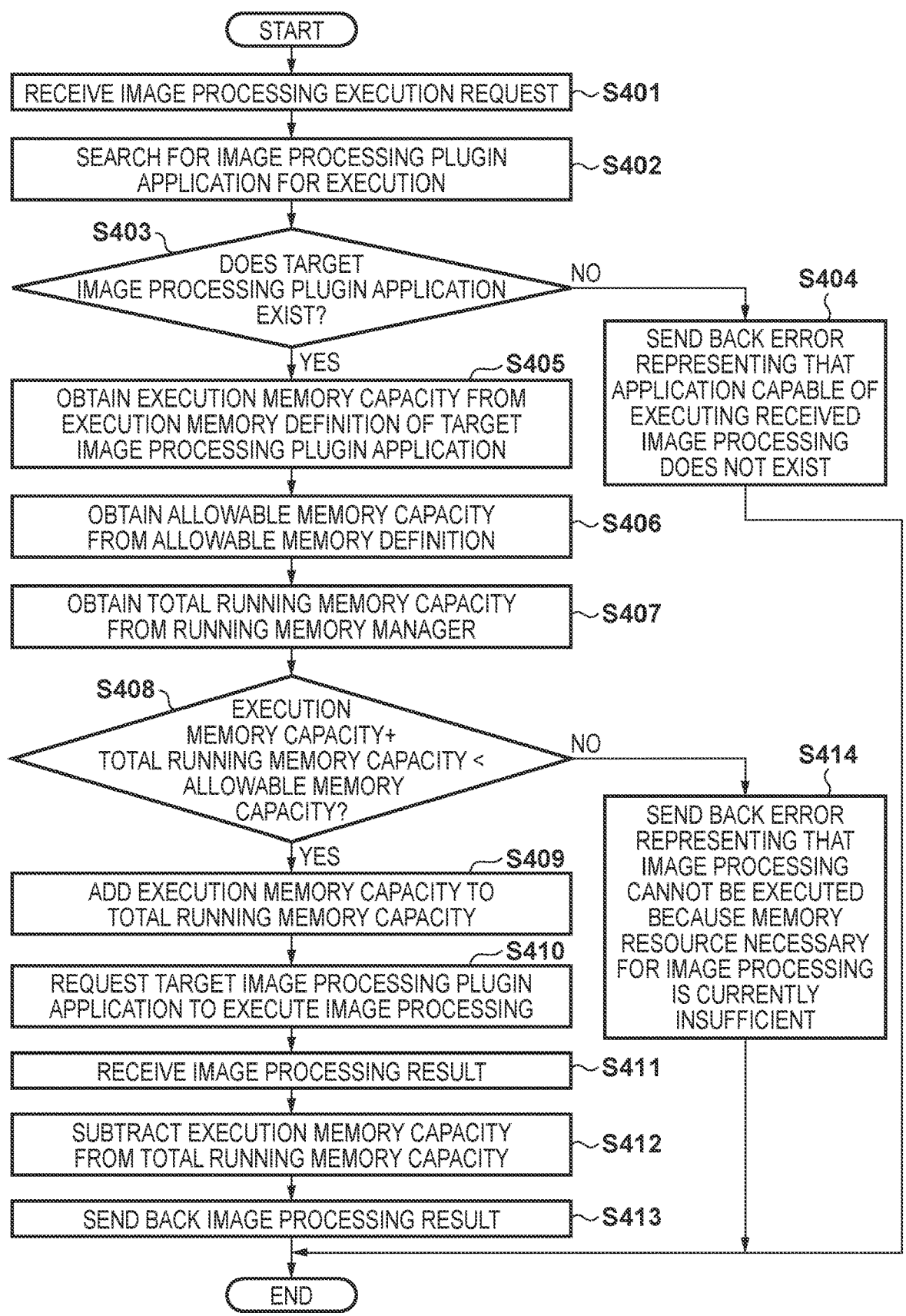
FIG. 4 is a flowchart showing a processing procedure by the image processing apparatus according to the embodiment.

Next, an example of a processing procedure by the image processing apparatus 101 according to this embodiment will be described with reference to FIG. 4. A case is assumed here in which the image processing connection library 332 accepts image processing, performs memory control, and then requests the processing of the image processing plugin application 303. This flowchart represents an example of image processing using the image processing plugin application 303. Note that processing to be described below is implemented when, for example, the CPU 211 reads out, to the RAM 212, a program saved in the HDD 213 and executes the program.

First, in step S401, the image processing connection library 332 receives an image processing execution request from the device control application 304, the native image processing connection library 314, or the single function plugin application 302. At this time, the received execution request is assumed to include parameters necessary to specify the image processing plugin application 303 of which the processing is requested.

Then, in step S402, the image processing connection library 332 searches for the image processing plugin application 303 capable of executing image processing corresponding to the obtained execution request. In step S403, the image processing connection library 332 determines based on the result of the search in step S402 whether a target image processing plugin application exists.

If the image processing connection library 332 determines in step S403 that an application capable of executing the received image processing request does not exist, the process advances to step S404 in which the image processing connection library 332 sends back, to the module of the request source, an error representing that an application capable of executing the received image processing request does not exist. Thereafter, the process ends. For example, when the native image processing connection library 314 is the request source, the above-described error contents are propagated to the device control application 304 or the single function plugin application 302 via the device control library 309. The device control application 304 or the single function plugin application 302 displays the received error contents on the operation screen of each application. This error can notify the user of the absence of the module necessary for the processing. A serviceman or an IT manager installs the necessary image processing plugin application 303 by the above-described installation method and can continue the processing.

If the image processing connection library 332 determines in step S403 that the target image processing plugin application 303 exists, the process advances to step S405 in which the image processing connection library 332 obtains an execution memory capacity from the execution memory definition 327 of the target image processing plugin application 303. As described above, the execution memory capacity may be defined for each plugin unit or held by each function unit of image processing in each plugin. Subsequently, in step S406, the image processing connection library 332 obtains an allowable memory capacity from the allowable memory definition 325 of the image processing connection library 332. In step S407, the image processing connection library 332 obtains a total running memory capacity from the running memory manager 326 of the image processing connection library 332.

In step S408, the image processing connection library 332 determines whether the sum of the obtained running memory capacity and the total running memory capacity managed by the image processing connection library 332 exceeds the allowable memory capacity (whether the memory becomes insufficient). If the image processing connection library 332 determines that the sum does not exceed the allowable memory capacity, it adds in step S409 the execution memory capacity defined by the execution memory definition 327 to the running memory capacity managed by the running memory manager 326. In step S410, the image processing connection library 332 requests processing of the target image processing plugin application 303. The image processing plugin application 303 receives the image processing request together with the processing parameters from the image processing connection library 332, and executes image processing in accordance with the processing parameters. There are a method of performing image processing within the image processing plugin application 303 and a method of executing it by the native image processing module 316, details of which will be described later. At the time of executing image processing, the CPU 211 deploys input data in the RAM 212 in the image processing plugin application 303 or the native image processing module 316. At this time, a memory of a capacity corresponding to the image processing contents and the input data size needs to be allocated. After that, the image processing connection library 332 receives a processing result from the image processing plugin application 303 in step S411, and subtracts the execution memory capacity from the total running memory capacity in step S412. In step S413, the image processing connection library 332 sends back the image processing result to each module of the request source and ends the process.

If the image processing connection library 332 determines in step S408 that the sum exceeds the allowable memory capacity, the process advances to step S414 in which the image processing connection library 332 sends back, to the module of the request source, an error representing that the image processing cannot be executed because the memory resource necessary for the image processing is currently insufficient (because of an insufficient memory), and ends the process. When the native image processing connection library 314 is the request source, the above-described error contents are propagated to the device control application 304 or the single function plugin application 302 via the device control library 309. The device control application 304 or the single function plugin application 302 executes exceptional processing based on the received error contents described above.

An example of the exceptional processing is retry processing. When each application receives the above-described error, it can determine that a plurality of image processes are simultaneously executed on the image processing connection library 332. Each application waits by retry until currently running image processing ends temporarily, and at the timing when the running image processing ends, transmits an image processing request again. The processing can therefore continue without interruption.

Another exceptional processing is control of displaying, on the operation screen of each application, an error that prompts input of a job again after a time (after the lapse of a predetermined time) because a plurality of image processes are executed simultaneously. This error can notify the user that the job can be executed after a time.

As described above, according to this embodiment, before processing is requested of a module (plugin application) that executes image processing, it is determined whether the memory capacity exceeds an allowable memory capacity owing to the image processing to be executed. If the memory capacity exceeds the allowable memory capacity, the image processing is not requested in the first place. In this embodiment, allocation of a memory exceeding the allowable memory capacity can be avoided. The memory allocation can be controlled before the system operation becomes unstable due to allocation of a memory exceeding the memory capacity allowed by the system.

Image Processing by Image Processing Plugin Application

Image processing by the image processing plugin application will be described below. When image processing is requested of the image processing plugin application 303, the image processing plugin application 303 executes the image processing based on the requested processing contents. The image processing plugin application 303 can execute the image processing by at least two methods. The first method is to execute the image processing within the image processing plugin application 303. In this case, the image processing plugin application executes the image processing based on the processing request and processing parameters received from the image processing connection library 332. In this case, the image processing plugin application needs to be described in the Java language. The second method is to request the image processing of the native image processing module 316. The image processing plugin application 303 requests the processing of the native image processing client 331 and can execute the image processing in an image processing-dedicated process different from the image processing plugin application 303.

Figure 5:
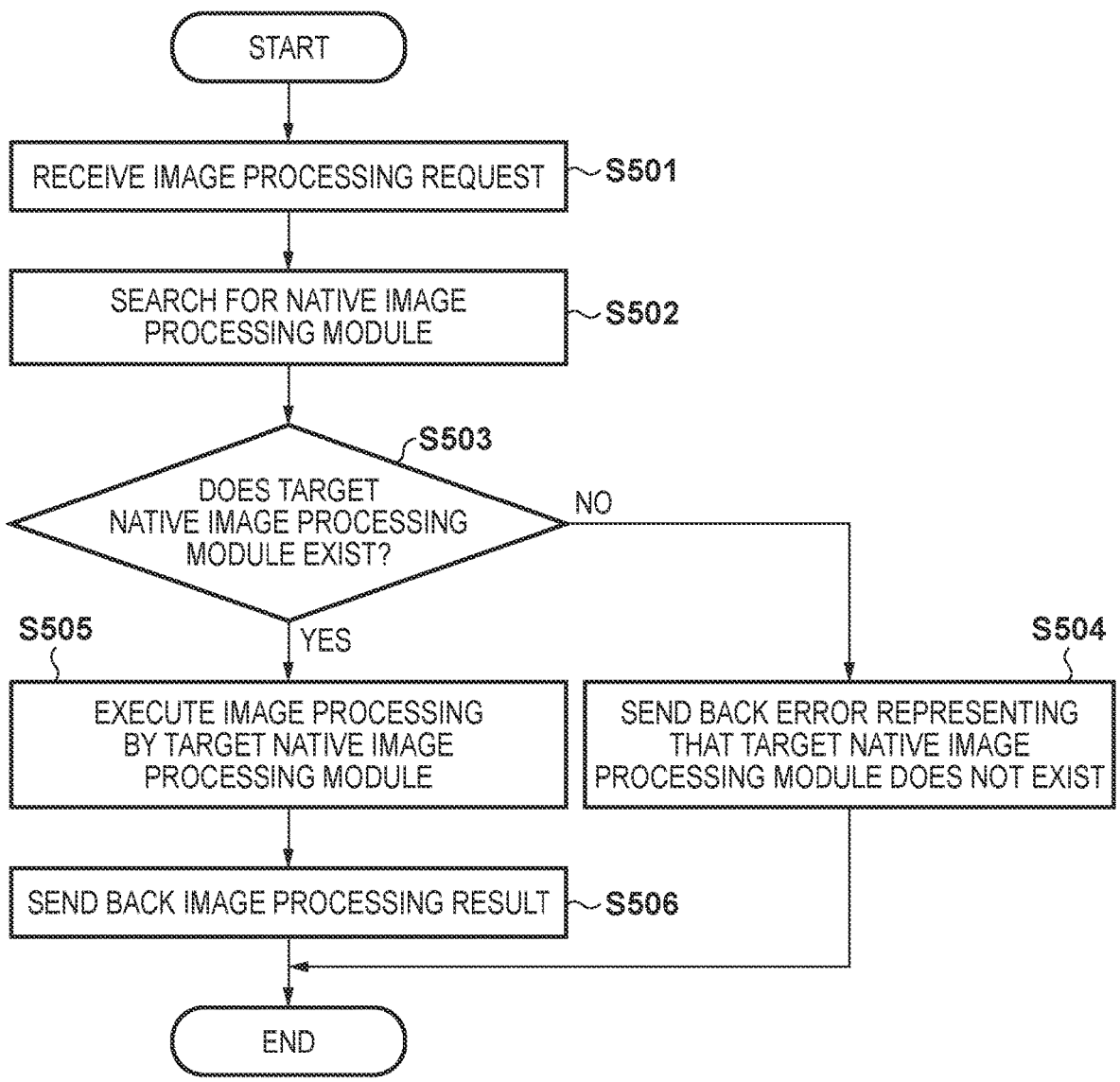
FIG. 5 is a flowchart showing a processing procedure by a native image processing server according to the embodiment.

A processing procedure for executing image processing by the image processing plugin application 303 will be described with reference to FIG. 5. This flowchart represents a processing procedure for requesting the native image processing server 315 to execute image processing. Note that processing to be described below is implemented when, for example, the CPU 211 reads out, to the RAM 212, a program saved in the HDD 213 and executes the program.

The image processing plugin application 303 transmits an image processing request together with processing parameters to the native image processing client 331. The native image processing client 331 requests processing of the native image processing server 315 together with the received processing parameters.

The native image processing server 315 receives the image processing execution request in step S501 and searches for the target native image processing module 316 based on the received processing parameters in step S502. In step S503, the native image processing server 315 determines whether the target native image processing module 316 exists. If the target native image processing module 316 does not exist, the process advances to step S504 in which the native image processing server 315 sends back, to the native image processing client 331, an error representing that the target native image processing module 316 does not exist, and ends the process.

If the target native image processing module 316 exists, the process advances to step S505 in which the native image processing server 315 causes the target native image processing module 316 to execute the image processing based on the received processing parameters. Then, in step S506, the native image processing server 315 sends back the result of the image processing in step S505 to the native image processing client 331, and ends the process. When the native image processing client 331 receives the image processing result or the error contents, it sends back the contents to the image processing plugin application 303.

As described above, the image processing apparatus according to this embodiment is an image processing apparatus capable of executing a plurality of image processes by one or more plugin applications. When the image processing apparatus is requested to execute a new image process by a plugin application during execution of image processes by a plugin application, it searches for a plugin application capable of executing the new image process. In addition, the image processing apparatus obtains a memory usage when the new image process is executed by the plugin application, which is held together with the searched plugin application, and the memory usages of the respective image processes already running by the plugin application. The image processing apparatus compares a total memory usage obtained from the obtained memory usages of the respective image processes and the memory usage when the requested new image process is executed, with an allowable memory capacity representing a memory usage allowed to be used in a process of executing the plugin application. When the total memory usage does not exceed the allowable memory capacity as a result of the comparison, the image processing apparatus executes the new image process. When the total memory usage exceeds the allowable memory capacity, the image processing apparatus notifies the request source of an error representing that the new image process cannot be executed owing to an insufficient memory, without executing the new image process. Memory control on a plurality of image processes can therefore be performed in the run time by calculating the total memory of running image processes at the time of executing an image process, without restricting activation (installation) of the image processing plugin application 303. According to this embodiment, a plurality of image processes can be executed while preferably avoiding an insufficient memory. This can improve the user convenience.

The present invention is not limited to the above-described embodiment and various modifications are possible. For example, an execution memory defined in the execution memory definition 327 of the image processing plugin application 303 can describe an execution memory used when the native image processing module 316 executes image processing.

Second Embodiment

The second embodiment of the present invention will be described below. The first embodiment has described an example in which the image processing connection library 332 performs memory control on a plurality of image processes in the run time. The second embodiment will describe an example in which when a plugin application requests image processing, a native image processing server 315 performs memory control on a plurality of image processes within a native image processing control process 350.

Software Arrangement of Image Processing Apparatus

Figure 6:
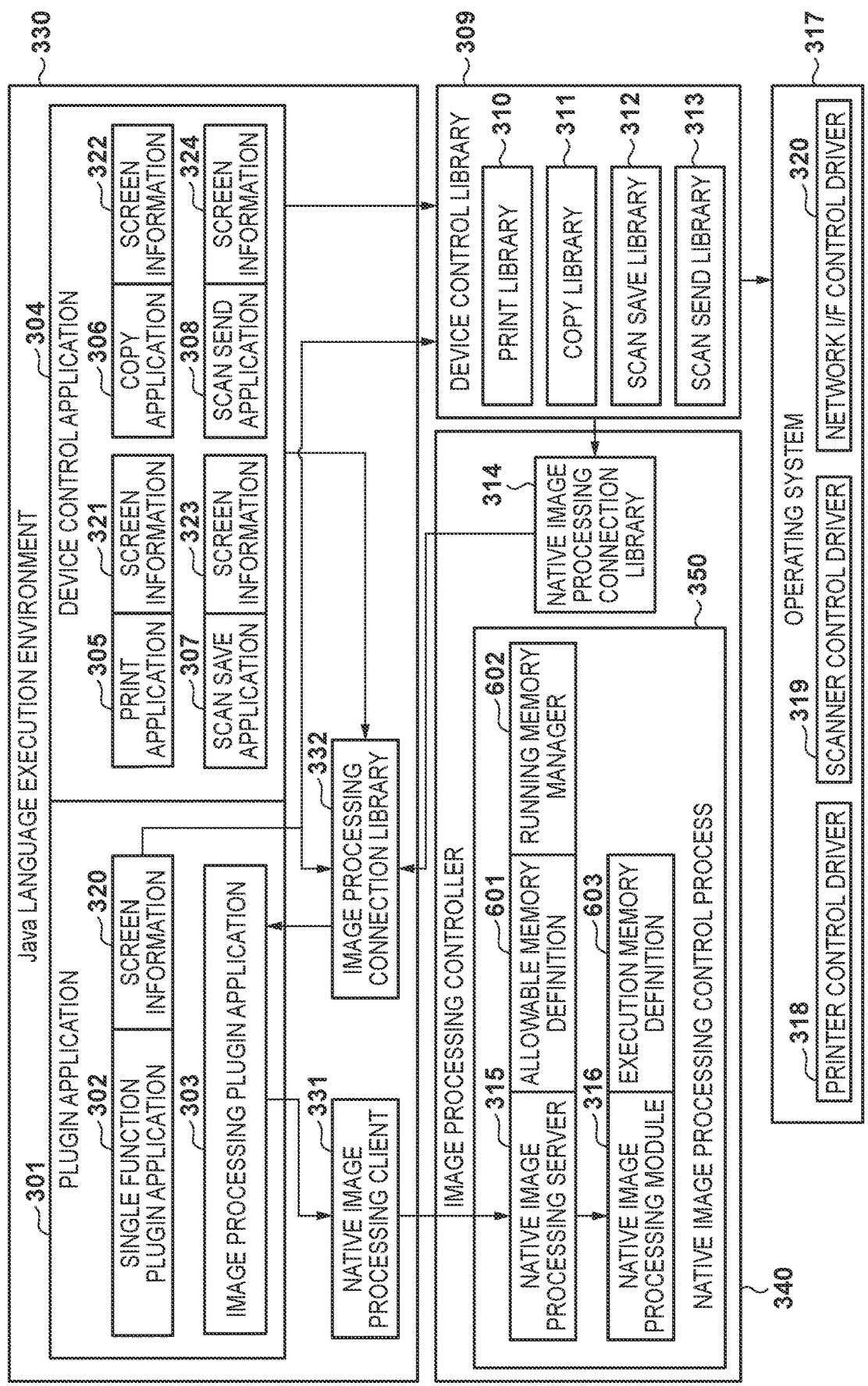
FIG. 6 is a block diagram showing an example of the software arrangement of an image processing apparatus according to an embodiment.

First, an example of the structure of software processed by a CPU 211 according to this embodiment will be described with reference to FIG. 6. Note that the basic arrangement is the same as the contents described with reference to FIG. 3 in the first embodiment, so a difference will be mainly explained. The same reference numerals denote the same parts and a description thereof will not be repeated.

The native image processing server 315 holds an allowable memory definition 601. The allowable memory definition 601 defines a maximum allowable memory capacity possible at the time of simultaneous execution on the native image processing server 315. An allowable memory capacity defined in the allowable memory definition 601 may be directly described in a program and obtained from an HDD 213. Alternatively, a file that defines an allowable memory capacity may be installed in advance and loaded at the time of execution. Note that the method of obtaining an allowable memory can be a method other than the above-described ones. The native image processing server 315 further holds a running memory manager 602. The running memory manager 602 manages the total memory capacity of running image processing via the native image processing server 315.

Processing Procedure

Figure 7:
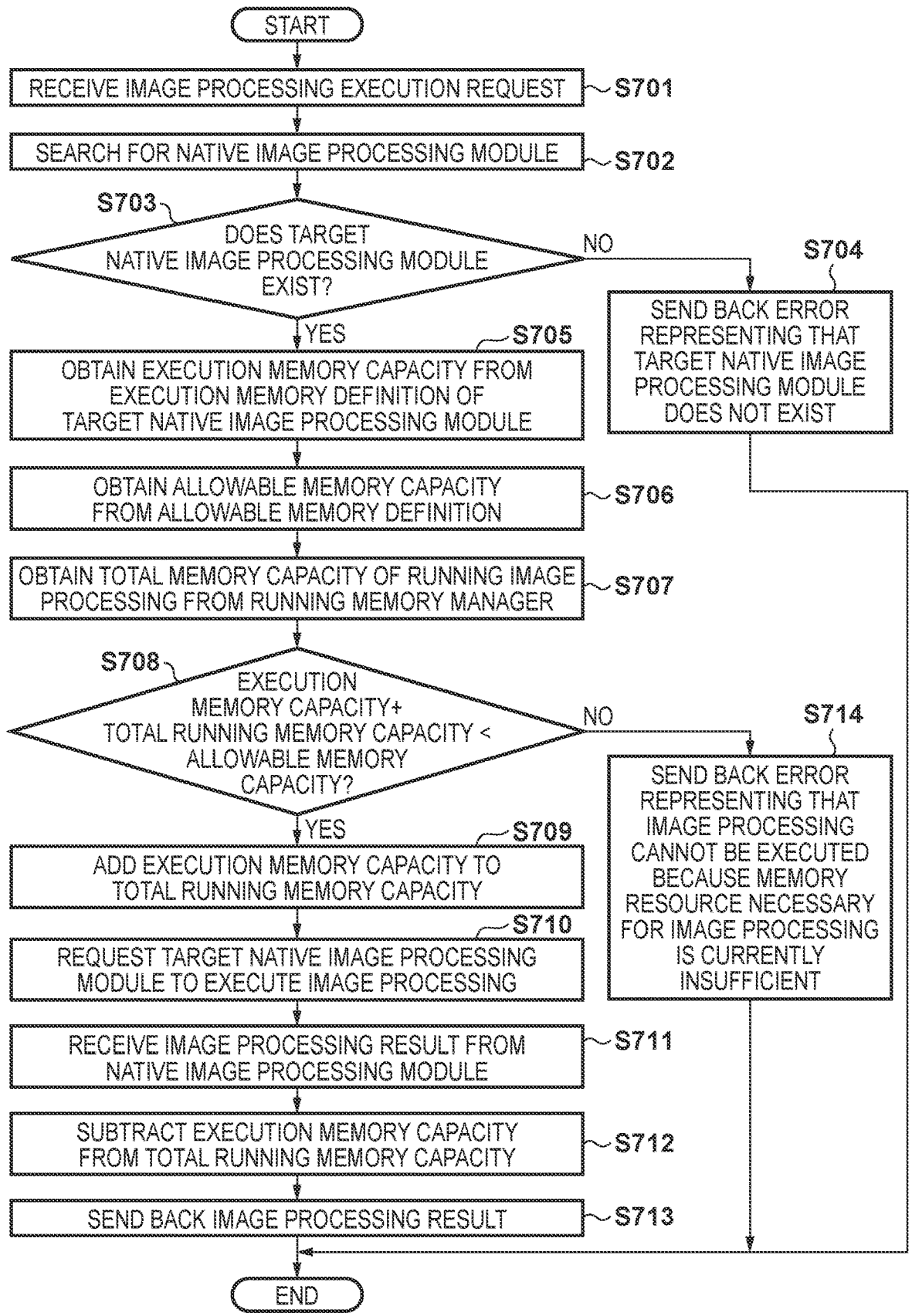
FIG. 7 is a flowchart showing a processing procedure by the image processing apparatus according to the embodiment.

Next, an example of a processing procedure by an image processing apparatus 101 according to this embodiment will be described with reference to FIG. 7. A case is assumed here in which the native image processing server 315 manages the memory of running image processing and executes image processing. The request source of this image processing is an image processing plugin application 303. Note that processing to be described below is implemented when, for example, the CPU 211 reads out, to a RAM 212, a program saved in the HDD 213 and executes the program.

The native image processing server 315 receives an image processing execution request together with processing parameters from a native image processing client 331 in step S701, and searches for a native image processing module 316 in step S702. In step S703, the native image processing server 315 determines based on the result of the search in step S702 whether the target native image processing module 316 exists.

If the target native image processing module 316 does not exist, the process advances to step S704 in which the native image processing server 315 sends back an error representing that the target native image processing module 316 does not exist, and ends the process. Upon receiving the error, the native image processing client 331 propagates the error contents to the image processing plugin application 303 serving as the request source. In this case, the necessary native image processing module 316 is not installed in the HDD 213 of the image processing apparatus 101 and is not generated in a normal operation. Hence, the developer needs to modify the source code.

If the target native image processing module 316 exists, the process advances to step S705 in which the native image processing server 315 obtains an execution memory capacity from an execution memory definition 603 of the target native image processing module 316. Subsequently, in step S706, the native image processing server 315 obtains an allowable memory capacity from the allowable memory definition 601 of the native image processing server 315. In step S707, the native image processing server 315 obtains a total running memory capacity from the running memory manager 602 of the native image processing server 315.

In step S708, the native image processing server 315 determines whether the sum of the obtained running memory capacity and the total running memory capacity exceeds the allowable memory capacity. If the native image processing server 315 determines that the sum does not exceed the allowable memory capacity, the process advances to step S709 in which the native image processing server 315 adds the execution memory capacity to the total running memory capacity. In step S710, the native image processing server 315 requests the native image processing module 316 to execute image processing. The native image processing module 316 receives the image processing request together with processing parameters and executes the image processing in accordance with the processing parameters. At the time of executing the image processing, the CPU 211 deploys input data in the RAM 212 and performs processing in the native image processing module 316. At this time, a memory needs to be allocated in accordance with the image processing contents and the input data size.

The native image processing server 315 receives the image processing result from the native image processing module 316 in step S711, and subtracts the execution memory capacity from the total running memory capacity in step S712. In step S713, the native image processing server 315 sends back the image processing result to the native image processing client 331 and ends the process.

If the native image processing server 315 determines in step S708 that the sum exceeds the allowable memory capacity, the process advances to step S714 in which the native image processing server 315 sends back, to the native image processing client 331, an error representing that the image processing cannot be executed because the necessary memory resource is currently insufficient. After that, the process ends.

The native image processing client 331 propagates the above-described image processing result and error contents to the image processing plugin application 303. The image processing plugin application receives the image processing result and propagates it to the module of the request source via the image processing connection library 332. When an error representing an insufficient memory resource is received, exceptional processing is executed. An example of the exceptional processing is retry processing. When the above-mentioned error is received, the image processing plugin application 303 can determine that the image processing cannot be executed because running image processing exists. Thus, the processing is requested of the image processing client 331 after a predetermined time and can be executed. Retry processing performed within the image processing plugin application has an advantage of not performing retry processing by the module of the request source. As another exceptional processing, the above-described error is propagated to even the single function plugin application 302 and the device control application 304 at the request source. When both a case in which retry is desirably performed and a case in which retry is desirably interrupted are conceivable depending on an application, retry and interruption can be switched within the application by propagating the above-described error to the application side.

As described above, control is performed by determining in advance whether a memory capacity exceeds an allowable memory capacity due to image processing to be executed before requesting the processing of the native image processing module 316. If the memory capacity exceeds the allowable memory capacity, the image processing is not requested in the first place and no memory is wastefully allocated. The memory allocation can be controlled in advance before the system operation becomes unstable owing to allocating a memory exceeding the memory capacity allowed by the system (apparatus).

In this embodiment, the same memory control may be performed on even another image processing control process implemented by a plugin, in parallel to the above-described memory control within the native image processing control process 350. That is, an allowable memory capacity may be defined for each process. For example, the arrangement according to the second embodiment may be applied in combination with the arrangement according to the first embodiment.

According to this embodiment, memory control on a plurality of image processes can be performed in the run time by calculating the total memory of running image processes at the time of executing an image process, without restricting activation of the image processing plugin application 303. This can improve the user convenience. Unlike the first embodiment, memory management can be performed restrictively within a process (native image processing control process 350) dedicated to perform image processing. The image processing plugin application 303 need not pay attention to memory control of image processing on the native image processing control process 350. The development efficiency of the image processing plugin application 303 is advantageously improved.

Third Embodiment

The third embodiment of the present invention will be described below. This embodiment will explain an example in which a native image processing module 316 mainly performs memory control. In the third embodiment, when memory control is performed and parallel processing cannot be performed, unlike the first and second embodiments, processing is performed without quickly sending back an error. When parallel processing can be performed on image processes of a plurality of pages, the processes are speeded up using parallel processing.

Processing Procedure

Figure 8A:
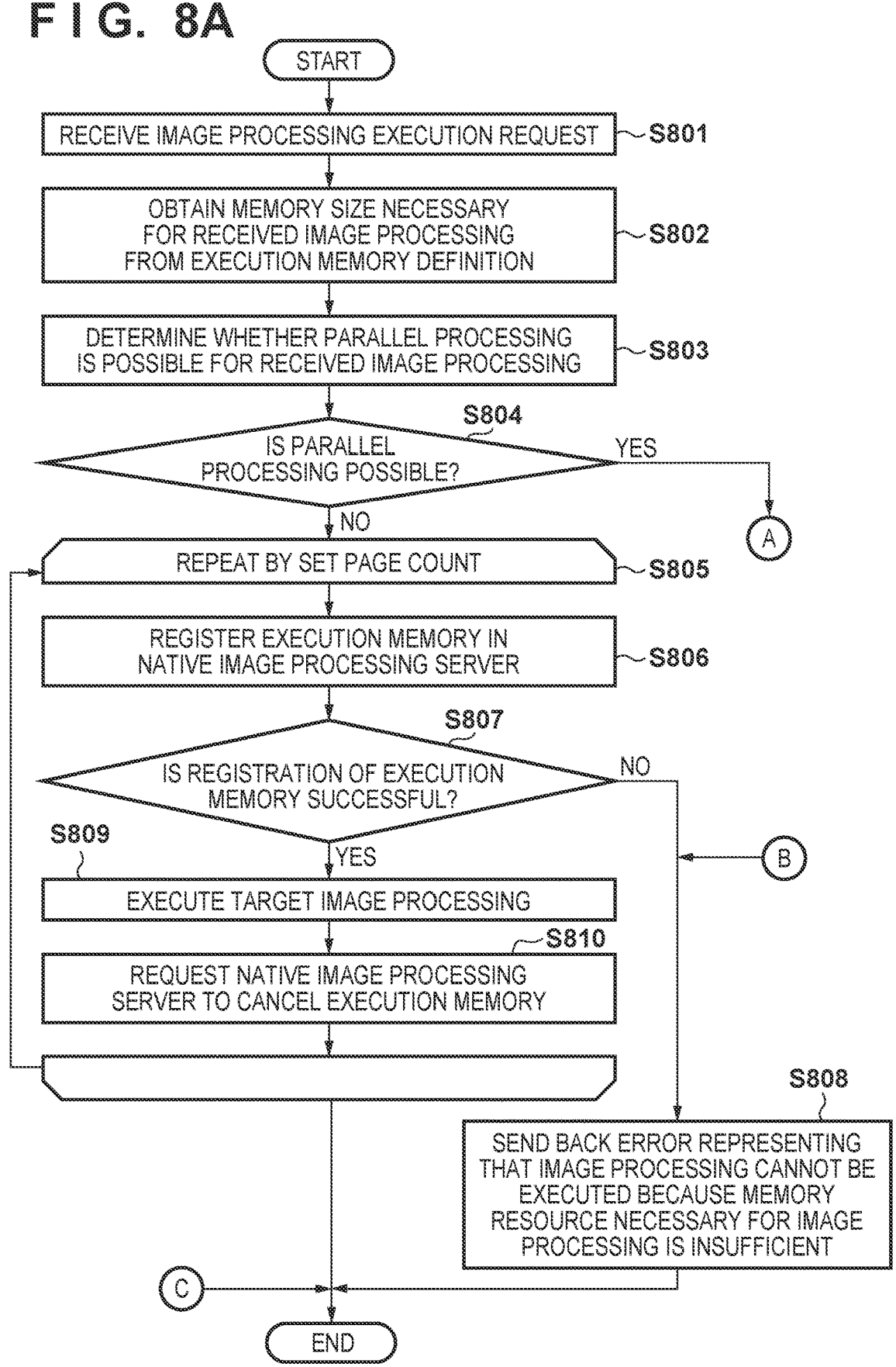
FIGS. 8A and 8B are a flowchart showing a processing procedure by a native image processing module according to an embodiment.
Figure 8B:
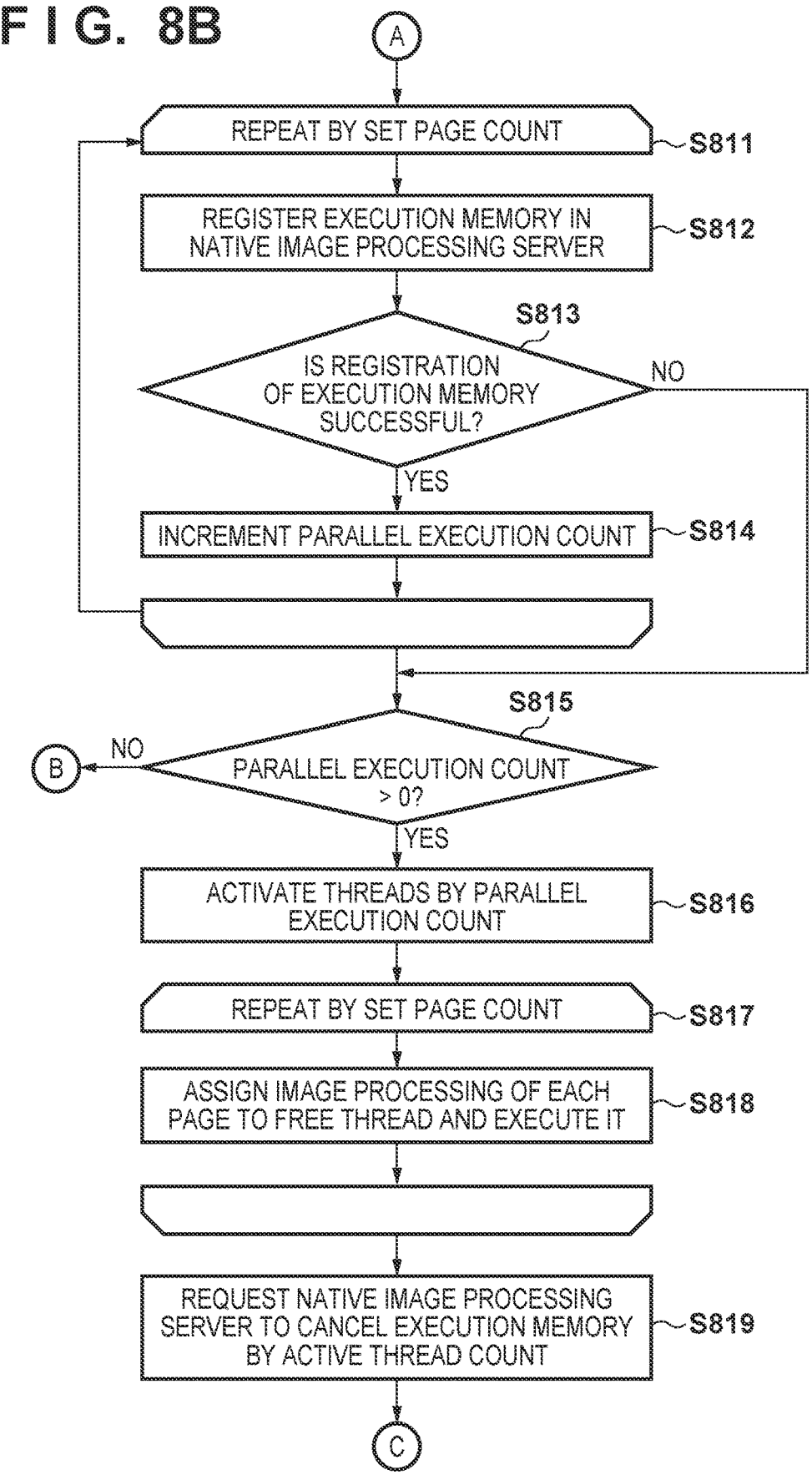

First, an example of a processing procedure by an image processing apparatus 101 according to this embodiment will be described with reference to FIGS. 8A and 8B. An example will be explained in which the native image processing module 316 registers an execution memory in a native image processing server 315 and performs memory control. Note that processing to be described below is implemented when, for example, a CPU 211 reads out, to a RAM 212, a program saved in an HDD 213 and executes the program.

First, in step S801, the native image processing module 316 receives an image processing execution request from the native image processing server 315. Then, in step S802, the native image processing module 316 obtains a memory size (memory usage) necessary for the received image processing from an execution memory definition 603. In step S803, the native image processing module 316 determines whether parallel processing is possible for the received image processing. The native image processing module 316 may have information representing whether parallel processing is possible and make the determination using this information. Note that the information representing whether parallel processing is possible may be used to determine whether parallel processing is possible, based on the necessary memory usage and the memory usages of respective image processes already running by a native application, as described in the first and second embodiments. For example, a threshold memory capacity corresponding to a total memory usage may be determined so that the total memory usage does not exceed an allowable memory capacity when parallel processing is performed at the two total memory usages, and the determination may be made based on the result of comparison between the threshold memory capacity and the allowable memory capacity. Alternatively, information (for example, threshold memory capacity) representing whether parallel processing is possible may be added in advance as meta information to the execution memory definition 603 and read out to make a determination.

If the native image processing module 316 determines in step S804 based on the result of the determination in step S803 that parallel processing is impossible for the received image processing, the process advances to step S805. If the native image processing module 316 determines that parallel processing is possible, the process advances to step S811.

Step S805 represents processing of repeating processes in steps S806 to S810 by the number of pages of synchronously received image processes when parallel processing is impossible (respective image processes are executed sequentially). In step S806, the native image processing module 316 registers memory information obtained from the execution memory definition 603 of the native image processing module 316 in the native image processing server 315. Details of the registration of memory information by the native image processing server 315 will be described later with reference to FIG. 9. In step S807, the native image processing module 316 determines whether the registration of an execution memory is successful in step S806. If the registration fails, the process advances to step S808 in which the native image processing module 316 sends back, to the native image processing server 315, an error representing that the image processing cannot be executed because the memory resource necessary for the image processing is insufficient, and ends the process. The native image processing server 315 propagates the error to an application on the calling side via a native image processing client 331.

If the registration of the execution memory in the native image processing server 315 is successful, the process advances to step S809 in which the native image processing module 316 executes the target image processing. Upon the completion of the image processing, the native image processing module 316 requests in step S810 the native image processing server 315 to cancel the execution memory together with information of the memory to be canceled. After the end of the repetitive loop processing, the process ends.

If the native image processing module 316 determines in step S804 that parallel processing is possible, the process advances to step S811 in which processes in steps S812 to S814 are repeated by the number of pages of synchronously received image processes when parallel processing is possible. In step S812, the native image processing module 316 registers an execution memory obtained from the execution memory definition 603 of the native image processing module 316 in the native image processing server 315. Note that the sequence of memory registration by the native image processing server 315 will be described later with reference to FIG. 9. In step S813, the native image processing module 316 determines whether the registration of the execution memory is successful. If the registration is successful, the process advances to step S814 in which the native image processing module 316 increments a parallel execution count. The parallel execution count represents the number of threads to be executed in parallel and is a variable managed in the RAM 212, the HDD 213, or the like. If the registration of the execution memory fails, the process escapes from this loop processing and advances to step S815. If the repetitive loop processing ends, the process advances to step S815. In the stage in which the process escapes from the loop processing, a positive integer of a range from 0 to a set page count is entered in the parallel execution count.

In step S815, the native image processing module 316 determines whether the calculated parallel execution count is larger than 0. If the parallel execution count is larger than 0, the process advances to step S816; otherwise, to step S808. In step S808, the native image processing module 316 sends back, to the native image processing server 315, an error representing that the image processing cannot be executed because the memory resource necessary for the image processing is insufficient, and ends the process. The native image processing server 315 propagates the error to the application on the calling side via the native image processing client 331.

If the parallel execution count is an integer of 1 or more, the process advances to step S816 in which the native image processing module 316 activates threads by the parallel execution count. Although threads are activated in this embodiment, processes may be activated. Subsequently, the process advances to step S817 in which processing in step S818 is repeated by the set page count. In step S818, the native image processing module 316 assigns image processing of each page to a free thread and executes it. After the process escapes from this loop processing, execution of the image processes of all the threads is completed, and the image processes on all the received pages is completed. Finally, in step S819, the native image processing module 316 requests the native image processing server 315 to cancel the execution memory by the active thread count, and ends the process.

Registration of Execution Memory

Figure 9:
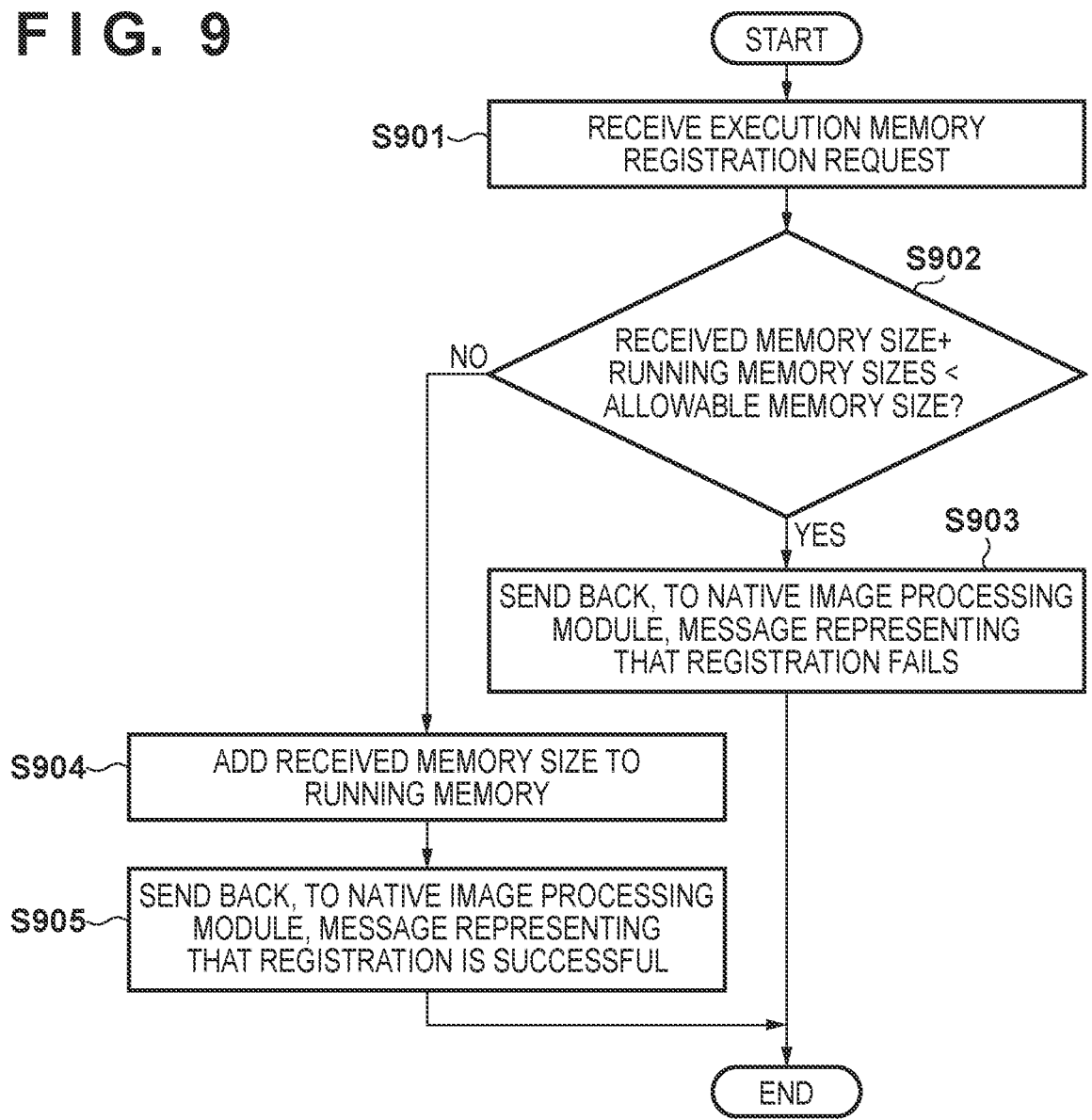
FIG. 9 is a flowchart showing a processing procedure by a native image processing server according to the embodiment.

A processing procedure when the native image processing server 315 receives an execution memory registration request from the native image processing module 316 in steps S806 and S812 will be described with reference to FIG. 9. Note that processing to be described below is implemented when, for example, the CPU 211 reads out, to the RAM 212, a program saved in the HDD 213 and executes the program.

In step S901, the native image processing server 315 receives an execution memory registration request together with execution memory information from the native image processing module 316. In step S902, the native image processing server 315 determines whether the sum of the received memory size and the memory sizes of running image processes exceeds the allowable memory size. If the sum exceeds the allowable memory size, the process advances to step S903 in which the native image processing server 315 sends back, to the native image processing module 316, a message representing that the registration fails. Then, the process ends. If the sum does not exceed the allowable memory size, the process advances to step S904 in which the native image processing server 315 adds the received memory size to the running memory and sends back, to the native image processing module 316 in step S905, a message representing that the registration is successful. Then, the process ends.

Cancellation of Execution Memory

Figure 10:
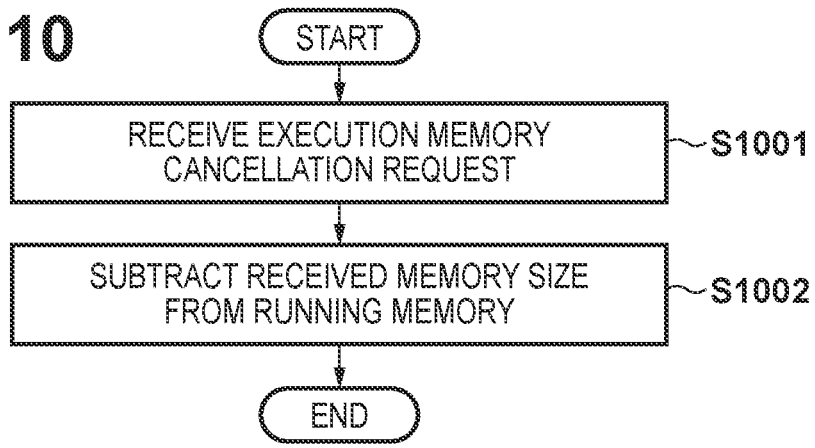
FIG. 10 is a flowchart showing a processing procedure by the native image processing server according to the embodiment.

A processing procedure when the native image processing server 315 receives an execution memory cancellation request from the native image processing module 316 in step S810 will be described with reference to FIG. 10. Note that processing to be described below is implemented when, for example, the CPU 211 reads out, to the RAM 212, a program saved in the HDD 213 and executes the program.

In step S1001, the native image processing server 315 receives an execution memory cancellation request from the native image processing module 316. In step S1002, the native image processing server 315 subtracts the received memory size from the running memory, and ends the process.

As described above, according to this embodiment, the native image processing module 316 can mainly execute memory control. Thread control can be performed appropriately in accordance with whether parallel processing is possible or not depending on the characteristic of the native image processing module 316. While performing memory control, the speed for a plurality of pages can be increased.

Fourth Embodiment

The fourth embodiment of the present invention will be described below. The third embodiment has described an example in which a parallel execution count is determined before execution of image processes of a plurality of pages and then parallel processing is performed in an image processing module capable of parallel execution. The fourth embodiment will describe an example in which a parallel execution count is dynamically increased during execution of image processes, as a modification of the third embodiment.

Processing Procedure

Figure 11:
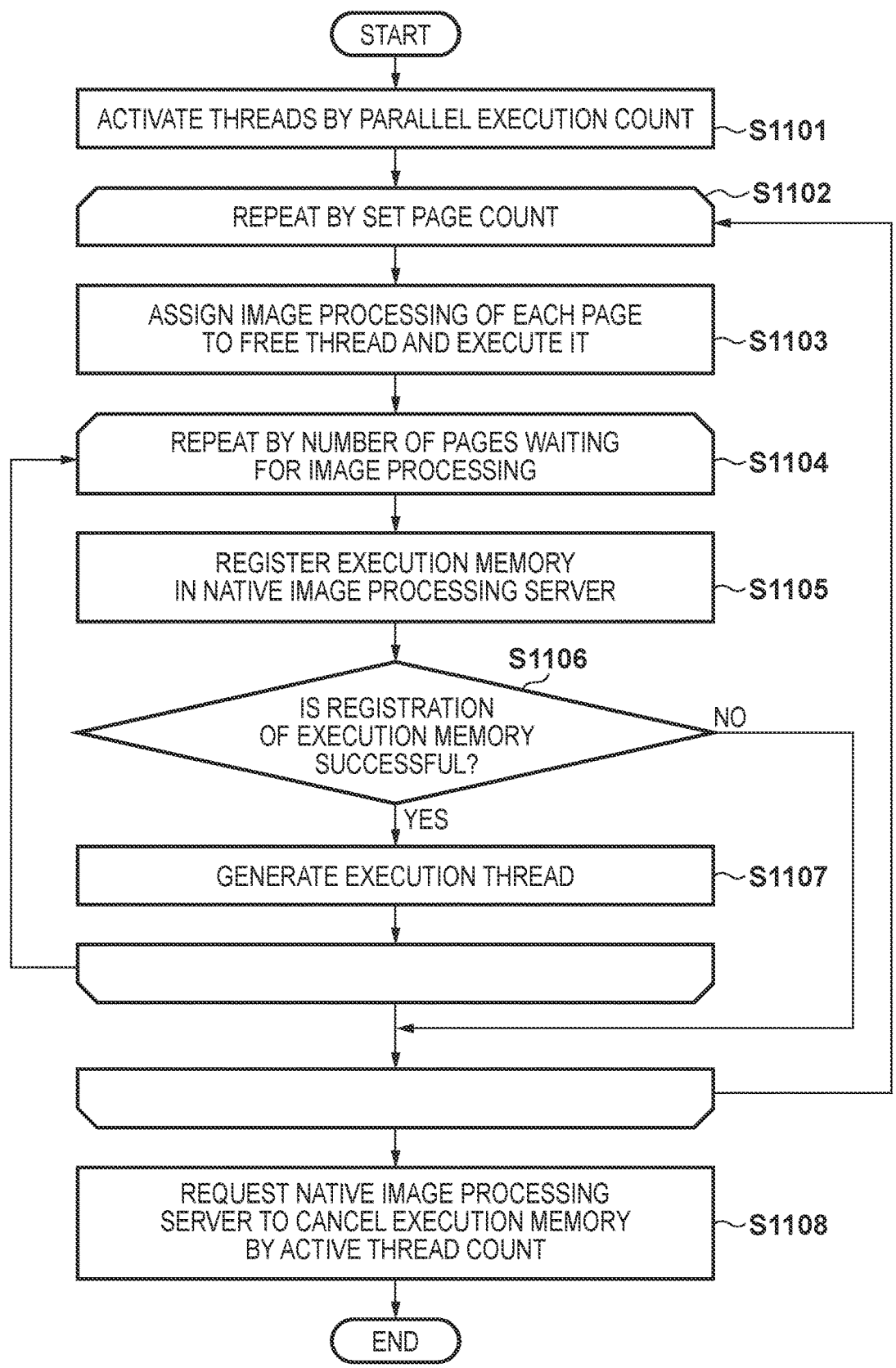
FIG. 11 is a flowchart showing a processing procedure by a native image processing module according to an embodiment.

First, a processing procedure for dynamically increasing a parallel execution count during image processing according to this embodiment will be described with reference to FIG. 11. This flowchart is a modification of processes in steps S816 to S819 in the flowchart of FIG. 8B. Processes performed before step S816 are the same as those in the flowchart of FIG. 8B. Note that processing to be described below is implemented when, for example, a CPU 211 reads out, to a RAM 212, a program saved in an HDD 213 and executes the program.

In step S1101, a native image processing module 316 activates threads by the parallel execution count. The process advances to step S1102 in which loop processing of steps S1103 to S1107 is executed repetitively by a set page count. More specifically, in step S1103, the native image processing module 316 assigns image processing of each page to a free thread and executes it. The process advances to step S1104 in which loop processing of steps S1105 to S1107 is executed repetitively by the number of pages waiting for image processing.

In step S1105, the native image processing module 316 registers an execution memory in a native image processing server 315. In step S1106, the native image processing module 316 determines whether the registration of the execution memory is successful. If the registration of the execution memory fails, the process escapes from the loop of step S1104 and returns to the loop of step S1102. If the native image processing module 316 determines in step S1106 that the registration of the execution memory is successful, it generates an execution thread and the process returns to step S1104. These loops are executed repetitively by the number of pages corresponding to set image processes (step S1102). As a result, the image processes of all the pages are completed, and the process advances to step S1108.

In step S1108, the native image processing module 316 requests the native image processing server 315 to cancel the execution memory by the active thread count, and ends the process. Note that processing sequences by the native image processing server 315 for the execution memory registration (step S1105) and the execution memory cancellation (step S1108) are the same as those described with reference to FIGS. 9 and 10.

As described above, according to this embodiment, an execution thread can be increased dynamically in image processes of a plurality of pages by making an inquiry to the native image processing server 315 between the image processes of respective pages. Therefore, image processes of a plurality of pages can be executed more efficiently than in the third embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-095632 filed on May 17, 2018 and Japanese Patent Application No. 2018-150641 filed on Aug. 9, 2018, which are hereby incorporated by reference herein in their entirety.

What is claimed is:

1. An image processing apparatus capable of respectively executing an image process by a plugin application and an image process by a native application
the apparatus comprising:
a memory device that stores a set of instructions; and
at least one processor that executes the set of instructions to:
install and activate the plugin application;
execute an image process by the plugin application in a process in which the plugin application operates when the image process by the pluqin application is requested;
in a case where a new image process by the native application is requested during execution of image processes by the native application preinstalled in the image processing apparatus;
obtain, after the new image process is requested, a memory usage when the new image process by the native application is executed, which is held together with the native application, and memory usages of the respective image processes already running by the native application;
compare a total memory usage obtained from the obtained memory usages of the respective image processes and the memory usage when the requested new image process is executed, with an allowable memory capacity representing a memory usage allowed to be used in another process in which the native application operates, different from the process in which the plugin application operates; and
in a case where the total memory usage does not exceed the allowable memory capacity as a result of the comparison, execute the new image process in a process in which the native application operates, and in a case where the total memory usage exceeds the allowable memory capacity, notify a request source of an error representing that the new image process cannot be executed owing to an insufficient memory, without executing the new image process,
wherein in a case where the image process by the plugin application is executed in a process in which the plugin application operates, the allowable memory capacity representing a memory usage allowed to be used in a process in which the native application operates is not considered.

2. The image processing apparatus according to claim 1, wherein the at least one processor executes instructions in the memory device to:
in a case where a new image process by a native application is requested during execution of image processes by a native application preinstalled in the image processing apparatus, determine whether parallel processing can be executed, from a memory usage when the new image process by the native application is executed and memory usages of the respective image processes already running by the native application; and in a case where the parallel processing cannot be executed as a result of the determination, sequentially execute the new image process and the already running image processes, and in a case where the parallel processing can be executed, execute in parallel the new image process and the already running image processes.

3. The image processing apparatus according to claim 2, wherein the at least one processor executes instructions in the memory device to:
dynamically determine whether the parallel processing is possible for each page of the image process.

4. The image processing apparatus according to claim 2, wherein the at least one processor executes instructions in the memory device to:
in a case where an execution memory for executing an image process cannot be allocated, send an error representing that the image process cannot be executed.

5. The image processing apparatus according to claim 1, wherein in a case where the request source receives the error, the request source requests the new image process again after a lapse of a predetermined time.

6. The image processing apparatus according to claim 1, wherein a request source of the new image process by the native application operates in a process different from a process in which the new image process is executed.

7. An image processing apparatus capable of executing plurality of image processes in a first execution environment for executing a program described in a first programming language and a second execution environment for executing a program described in a second programming language, the apparatus comprising:
a memory device that stores a set of instructions; and
at least one processor that executes the set of instructions to:
in a case where an image process by a first application described in the first programming language is requested, execute the image process by the first application in the first execution environment;
in a case where a new image process by a second application described in the second programming language is requested during execution of image processes in the second execution environment,
obtain, after the new image process is requested, a memory usage when the new image process by the second application is executed, which is held together with the searched second application, and memory usages of the respective image processes already running in the second execution environment;
compare a total memory usage obtained from the obtained memory usages of the respective image processes and the memory usage when the requested new image process is executed, with an allowable memory capacity representing a memory usage allowed to be used in the second execution environment; and
in a case where the total memory usage does not exceed the allowable memory capacity as a result of the comparison, execute the new image process in the second execution environment, and in a case where the total memory usage exceeds the allowable memory capacity, notify a request source of an error representing that the new image process cannot be executed owing to an insufficient memory, without executing the new image process,
wherein in a case where the image process by the first application is executed in the first execution environment, the allowable memory capacity representing a memory usage allowed to be used in the second execution environment is not considered.

8. The image processing apparatus according to claim 7, wherein the at least one processor executes instructions in the memory device to:
in a case where a new image process by a second application described in the second programming language is requested during execution of image processes in the second execution environment, determine whether parallel processing can be executed, from a memory usage when the new image process by the second application is executed and memory usages of the respective image processes already running in the second execution environment; and
in a case where the parallel processing cannot be executed as a result of the determination, sequentially execute the new image process and the already running image processes, and in a case where the parallel processing can be executed, execute in parallel the new image process and the already running image processes.

9. The image processing apparatus according to claim 8, wherein the at least one processor executes instructions in the memory device to:
dynamically determine whether the parallel processing is possible for each page of the image process.

10. The image processing apparatus according to claim 8, wherein the at least one processor executes instructions in the memory device to:
in a case where an execution memory for executing an image process cannot be allocated, send an error representing that the image process cannot be executed.

11. The image processing apparatus according to claim 7, wherein in a case where the request source receives the error, the request source requests the new image process again after a lapse of a predetermined time.

12. The image processing apparatus according to claim 7, wherein the memory usage when an image process is executed is held for each function included in the image process.

13. A method for controlling an image processing apparatus capable of respectively executing an image process by a plugin application and an image process by a native application, the method comprising:
installing and activating the plugin application;
executing an image process by the plugin application in a process in which the plugin application operates when the image process by the plugin application is requested;
in a case where a new image process by the native application is requested during execution of image processes by the native application preinstalled in the image processing apparatus
obtaining, after the new image process is requested, a memory usage when the new image process by the native application is executed, which is held together with the native application, and memory usages of the respective image processes already running by the native application;
comparing a total memory usage obtained from the obtained memory usages of the respective image processes and the memory usage when the requested new image process is executed, with an allowable memory capacity representing a memory usage allowed to be used in another process in which the native application operates, different from the process in which the plugin application operates; and in a case where the total memory usage does not exceed the allowable memory capacity as a result of the comparison, executing the new image process in a process in which the native application operates, and in a case where the total memory usage exceeds the allowable memory capacity, notifying a request source of an error representing that the new image process cannot be executed owing to an insufficient memory, without executing the new image process, wherein in a case where the image process by the plugin application is executed in a process in which the plugin application operates, the allowable memory capacity representing a memory usage allowed to be used in a process in which the native application operates is not considered.

14. A method for controlling an image processing apparatus capable of executing plurality of image processes in a first execution environment for executing a program described in a first programming language and a second execution environment for executing a program described in a second programming language, the method comprising:

in a case where an image process by a first application described in the first programming language is requested, executing the image process by the first application in the first execution environment;

in a case where a new image process by a second application described in the second programming language is requested during execution of image processes in the second execution environment, obtaining, after the new image process is requested, a memory usage when the new image process by the second application is executed, which is held together with the second application, and memory usages of the respective image processes already running in the second execution environment;

comparing a total memory usage obtained from the obtained memory usages of the respective image processes and the memory usage when the requested new image process is executed, with an allowable memory capacity representing a memory usage allowed to be used in the second execution environment; and in a case where the total memory usage does not exceed the allowable memory capacity as a result of the comparison, executing the new image process in the second execution environment, and in a case where the total memory usage exceeds the allowable memory capacity, notifying a request source of an error representing that the new image process cannot be executed owing to an insufficient memory, without executing the new image process, wherein in a case where the image process by the first application is executed in the first execution environment, the allowable memory capacity representing a memory usage allowed to be used in the second execution environment is not considered.

15. A non-transitory computer-readable storage medium storing a computer program for causing a computer to execute each step in a method for controlling an image processing apparatus capable of respectively executing an image process by a plugin application and an image process by a native application, the method comprising:

installing and activating the plugin application;

executing an image process by the plugin application in a process in which the plugin application operates when the image process by the plugin application is requested;

in a case where a new image process by the native application is requested during execution of image processes by the native application preinstalled in the image processing apparatus obtaining, after the new image process is requested, a memory usage when the new image process by the native application is executed, which is held together with the native application, and memory usages of the respective image processes already running by the native application;

comparing a total memory usage obtained from the obtained memory usages of the respective image processes and the memory usage when the requested new image process is executed, with an allowable memory capacity representing a memory usage allowed to be used in another process in which the native application operates, different from the process in which the plugin application operates; and in a case where the total memory usage does not exceed the allowable memory capacity as a result of the comparison, executing the new image process in a process in which the native application operates, and in a case where the total memory usage exceeds the allowable memory capacity, notifying a request source of an error representing that the new image process cannot be executed owing to an insufficient memory, without executing the new image process, wherein in a case where the image process by the plugin application is executed in a process in which the plugin application operates, the allowable memory capacity representing a memory usage allowed to be used in a process in which the native application operates is not considered.

16. A non-transitory computer-readable storage medium storing a computer program for causing a computer to execute each step in a method for controlling an image processing apparatus capable of executing plurality of image processes in a first execution environment for executing a program described in a first programming language and a second execution environment for executing a program described in a second programming language, the method comprising:

in a case where an image process by a first application described in the first programming language is requested, executing the image process by the first application in the first execution environment;

in a case where a new image process by a second application described in the second programming language is requested during execution of image processes in the second execution environment, obtaining, after the new image process is requested, a memory usage when the new image process by the second application is executed, which is held together with the second application, and memory usages of the respective image processes already running in the second execution environment;

comparing a total memory usage obtained from the obtained memory usages of the respective image processes and the memory usage when the requested new image process is executed, with an allowable memory capacity representing a memory usage allowed to be used in the second execution environment; and in a case where the total memory usage does not exceed the allowable memory capacity as a result of the comparison, executing the new image process in the second execution environment, and in a case where the total memory usage exceeds the allowable memory capacity, notifying a request source of an error representing that the new image process cannot be executed owing to an insufficient memory, without executing the new image process, wherein in a case where the image process by the first application is executed in the first execution environment, the allowable memory capacity representing a memory usage allowed to be used in the second execution environment is not considered.

* * * * *